(12) United States Patent
Muraoka et al.

(10) Patent No.: US 10,137,538 B2
(45) Date of Patent: Nov. 27, 2018

(54) LIQUID COATING DEVICE

(71) Applicant: Senju Metal Industry Co., Ltd., Tokyo (JP)

(72) Inventors: Manabu Muraoka, Tochigi (JP); Takeo Saitoh, Tochigi (JP); Shigeyuki Sekine, Tochigi (JP); Takashi Obayashi, Tochigi (JP); Kaichi Tsuruta, Tochigi (JP); Takashi Hagiwara, Tochigi (JP); Hiroyuki Yamasaki, Tochigi (JP); Kota Kikuchi, Tokyo (JP); Naoto Kameda, Tochigi (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 15/164,944

(22) Filed: May 26, 2016

(65) Prior Publication Data

US 2016/0346878 A1 Dec. 1, 2016

(30) Foreign Application Priority Data

May 27, 2015 (JP) .................................. 2015-107062

(51) Int. Cl.
  *B23K 35/40* (2006.01)
  *B05C 13/00* (2006.01)
  (Continued)

(52) U.S. Cl.
  CPC ............ *B23K 35/404* (2013.01); *B05C 3/125* (2013.01); *B05C 9/14* (2013.01); *B05C 13/00* (2013.01);
  (Continued)

(58) Field of Classification Search
  None
  See application file for complete search history.

(56) References Cited

U.S. PATENT DOCUMENTS 3,722,462 A   3/1973  Pohler et al.
4,141,317 A * 2/1979  Lakhani ............... G03G 15/101
                                              101/DIG. 37
(Continued)

FOREIGN PATENT DOCUMENTS

EP   2859980 A1   4/2015
JP   5475452 A   6/1979
(Continued)

*Primary Examiner* — Jethro M. Pence
(74) *Attorney, Agent, or Firm* — The Webb Law Firm

(57) ABSTRACT

In the flux applying device, a control portion controls conveying rollers or the like so that thickness of flux applied to solder is controlled. The winding roller rotates so that the solder is conveyed at the conveying speed. The drawing-out roller applies any load (back tension) to the solder backward along the conveying direction of the solder when drawing out the solder. The solder is conveyed at the predetermined speed and dipped into the flux tank containing flux. The solder is pulled up from the flux tank at the conveying speed vertically. By pulling up the solder from the flux tank at the constant conveying speed vertically, the interfacial tension acts on the solder 9a and the flux, so that the flux having a uniform thickness according to the conveying speed remains on the surface and back surface of the solder.

13 Claims, 5 Drawing Sheets

(51) Int. Cl.
*B05C 3/12* (2006.01)
*B23K 1/08* (2006.01)
*B23K 35/36* (2006.01)
*B05C 9/14* (2006.01)
B05C 9/04 (2006.01)
B05C 9/12 (2006.01)

(52) U.S. Cl.
CPC ............... *B23K 1/08* (2013.01); *B23K 35/36* (2013.01); *B05C 9/04* (2013.01); *B05C 9/12* (2013.01)

(56) References Cited

U.S. PATENT DOCUMENTS

| | | | | |
|---|---|---|---|---|
| 4,716,075 | A | * 12/1987 | Christ | ..................... C23C 2/265 162/146 |
| 4,790,686 | A | * 12/1988 | Christ | ..................... C23C 2/265 138/122 |
| 5,332,438 | A | 7/1994 | Ueda et al. | |
| 6,428,851 | B1 | 8/2002 | Friedersdorf et al. | |
| 2015/0174678 | A1 | 6/2015 | Sato et al. | |

FOREIGN PATENT DOCUMENTS

| | | | |
|---|---|---|---|
| JP | 8332431 | A | 12/1996 |
| JP | 20011136 | A | 1/2001 |
| JP | 201513248 | A | 1/2015 |

\* cited by examiner

LIQUID COATING DEVICE

CROSS REFERENCE TO RELATED APPLICATION

This application claims priority to Japanese Patent Application No. 2015-107062 filed May 27, 2015, the disclosure of which is hereby incorporated in its entirety by reference.

BACKGROUND OF THE INVENTION

Field of the Invention

The present invention relates to a liquid coating device that coats liquid on a surface of a matrix which has a long length and is made of metal, resin or the like by dipping the matrix into the liquid. It particularly relates to a liquid coating device that coats flux on a surface of solder formed as a matrix having a long length. It also particularly relates to a liquid coating device that coats liquid such as paint or the like on a surface of a matrix which is made of metal, resin or the like.

Description of Related Art

The following will describe the liquid coating device that coats liquid on a surface of a matrix which has a long length and is made of metal, resin or the like by dipping the matrix into the liquid, and a flux applying device used for soldering and the solder on which the flux is applied when using the liquid coating device, as an example of the object on which the liquid is coated when using the liquid coating device.

Flux used for soldering is applied to solder or the like through a flux applying step as a preliminary treatment of a soldering processing process. The flux has such effects that it chemically removes any metal oxides on a surface of the solder and a surface of the metal to be soldered; it prevents the metal surface from being again oxidized during a period of heating time in a soldering step; it reduces surface tension of the solder to improve wettability thereof. After the soldering, the flux forms intermetallic compounds between the solder and the metal to be soldered, thereby obtaining a strong joint therebetween.

Flux coating preform solder in which the flux is applied to a surface of the solder formed so as to have a long length has been proposed. Since in the flux coating preform solder, the flux has been previously coated before the soldering, it is possible to omit a flux applying step in the soldering time. Since the flux coating preform solder has a long length, it can be processed so as to be a suitable form such as a pellet, a washer and a disk, thereby allowing it to be applied to a various kinds of mounting technologies.

The coated flux in the flux coating preform solder is desirable to be almost uniformly applied on a surface of the solder. This is because if the flux is not uniformly applied on the surface of the solder, this becomes any cause of failure in the soldering.

Japanese Patent Application Publication No. S54-075452 discloses a flux applying apparatus in which a solder line is passed through a tank containing molten flux and rollers pull the solder line through a die so that the die adjusts an amount of flux applied to the solder line on an assumption that the flux is applied to the surface of the solder line just before the soldering.

SUMMARY OF THE INVENTION

When the flux applying device is used for a long period of time, the flux has been applied to the die which adjusts an amount of applied flux and solidified, so that it is difficult to apply the flux to the surface of solder with the uniform thickness thereof.

When changing the thickness of the flux to be applied to the solder, the die which adjusts an amount of applied flux may have to be replaced by another.

This invention addresses the above-mentioned issues and has an object to provide a liquid coating device that coats the flux on a surface of solder with uniform thickness thereof and maintains its uniformity even when the liquid coating device is used for a long period of time.

To achieve the above-mentioned object, a liquid coating device is provided according to this invention. The liquid coating device contains a dipping means that dips an object to be coated, the object having a long length, into liquid to coat the liquid on a surface of the object, a conveying means that conveys the object at a predetermined speed, the object coated by the dipping means being vertically lifted upward from a surface of the liquid, a load applying means that applies a predetermined load to the object conveyed by the conveying means, the load applying means being disposed at a upstream side of the dipping means along an object conveying path when a side of the object conveying path in which the object enters the dipping means is set to be the upstream side and a side of the object conveying path in which the object is discharged from the dipping means is set to be a downstream side, a drying means that dries the object on which the liquid is applied, a cooling means that cools the dried object, a conveying speed measurement means that measures a conveying speed of the object, a control means that controls the conveying means based on a measurement result of the conveying speed measurement means, and a chamber that applies the liquid to the object and contains at least the dipping means, the drying means and the cooling means, wherein the chamber includes a discharging means that is communicated to an outside of the chamber and discharges hot air within the chamber to the outside of the chamber.

It is desirable to provide the liquid coating device wherein the conveying means includes a drawing-out means that draws out the object to be coated, and the drawing means includes the load applying means.

It is also desirable to provide the liquid coating device wherein the conveying means includes winding means that winds the object, and the winding means winds the object so that a conveying speed of the object becomes constant.

It is further desirable to provide the liquid coating device wherein the conveying means includes at least one conveying roller, the conveying roller contains two rollers that nip the object, and the rollers nip both ends of the object along a width direction of the object.

It is additionally desirable to provide the liquid coating device wherein the conveying means includes a winding means and further includes an interlayer paper sheet supplying means that supplies an interlayer paper sheet when the winding means winds the solder.

It is also additionally desirable to provide the liquid coating device wherein the object to be coated includes solder and the liquid to be coated includes flux.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

DESCRIPTION OF THE PREFERRED EMBODIMENTS

The following will describe configuration examples of a flux applying device 100 as a preferred embodiment of a liquid coating device according to the invention and a flux coating preform solder formed by the flux applying device 100, with reference to drawings.

[Configuration Examples of Flux Applying Device 100]

Figure 1:
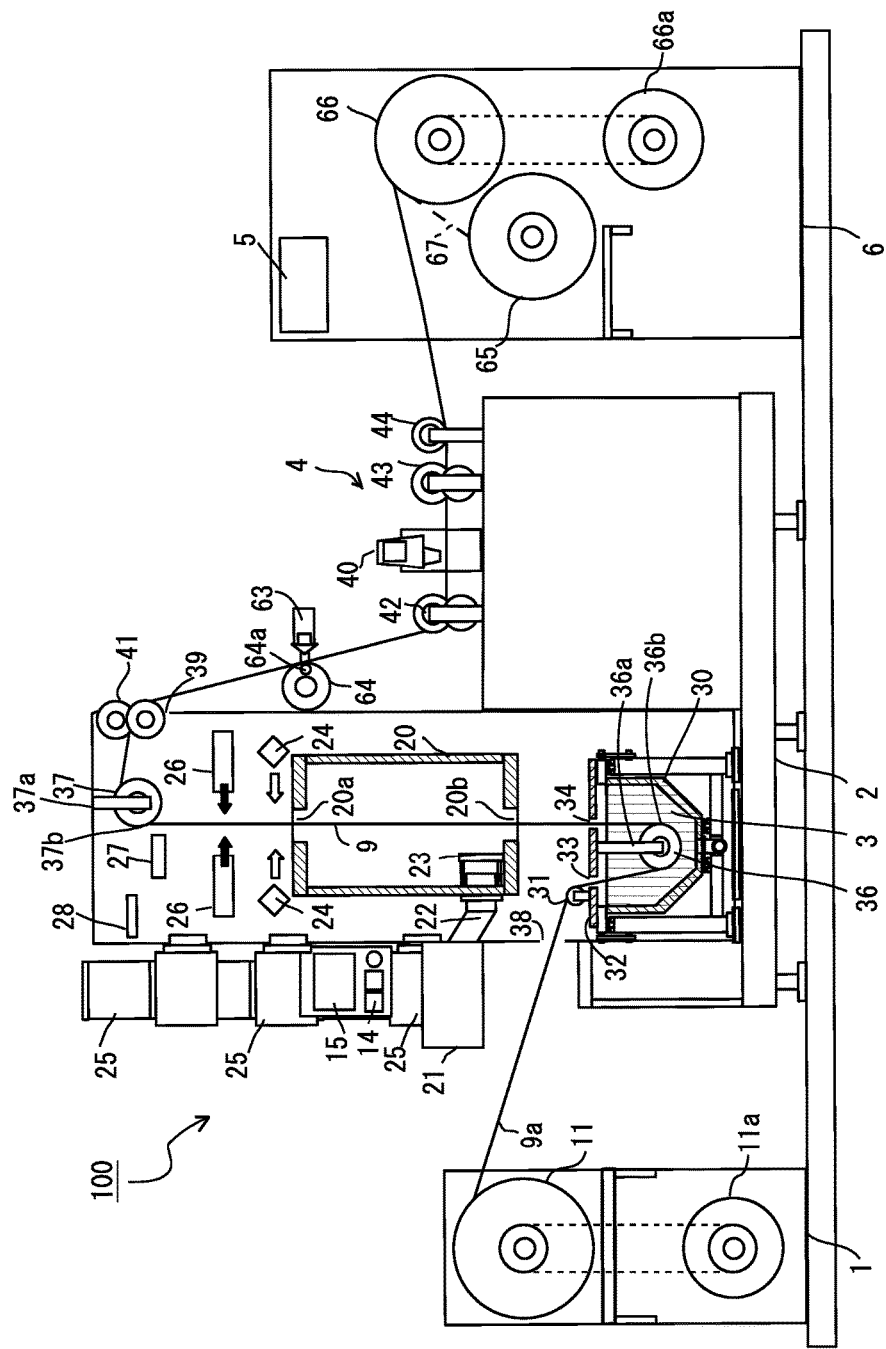
FIG. 1 is an outline plan view of a flux applying device 100 as an embodiment of a liquid coating device according to this invention showing a configuration example thereof.

The flux applying device 100 shown in FIG. 1 applies the liquid flux to a surface of the solder, as an example, with a uniform thickness. The solder is to be coated and is formed so as to have a long length and a predetermined width. It is assumed that a side of drawing out (supplying) the solder formed so as to have a long length and dipping it into a flux tank 30, namely a left side in the drawing is an upstream side along a conveying direction of the solder. It is also assumed that a side of discharging the solder from the flux tank 30 and winding it, namely a right side in the drawing is a downstream side along the conveying direction of the solder.

The flux applying device 100 contains a solder supplying portion 1, a chamber 2 that applies the flux 3 as the liquid to a surface of the solder 9a, a conveying portion 4 that conveys the solder 9 on which the flux is applied (coated), a laser sensor 63 that measures a conveying speed of the solder 9, a winding portion 6 that winds the conveyed solder 9, and a control portion 5 that controls each operation of the flux applying device 100. The flux applying device 100 may contain a film thickness gauge that measures thickness of the solder 9 on which the flux is applied (coated). Here, the solder 9a is referred to as the solder which is supplied from the solder supplying portion 1 but to which the flux 3 has not yet been applied (coated) in the chamber 2 and the solder 9 is referred to as the solder to which the flux 3 has been applied (coated) in the chamber 2. The solder 9 is wound in the winding portion 6 through the laser sensor 63 and the conveying portion 4. In this embodiment, a conveying member including the conveying portion 4 conveys the solder 9 or 9a.

The solder supplying portion 1 includes a drawing-out roller 11 on which, for example, the solder 9a is wound like a roll.

The drawing-out roller 11 applies any load (back tension) to the solder 9a backward along the conveying direction of the solder 9a when drawing out the solder 9a. The drawing-out roller 11 applies predetermined tension to the solder 9a which is conveyed at a predetermined speed.

Accordingly, predetermined torque is imparted to the drawing-out roller 11. A known powder brake can be used as an example thereof. For the drawing-out roller 11, a roller member such as a metallic roller, a rubber roller with heat resistance, a carbon roller and a resin roller can be used. Additionally, in this embodiment, the drawing-out roller 11 has not any driving source and is driven by any driving source in the conveying portion 4 as well as the powder brake or the like imparts back tension to the solder 9a. A drawing-out motor 11a shown in FIG. 1 may be used for driving the drawing-out roller 11. In such a configuration, a program is previously performed to drawing out the solder 9a wound on the drawing-out roller 11 at a fixed peripheral speed in spite of a diameter of wound solder 9a (an amount of wound solder) on the drawing-out roller 11. In addition, the laser sensor 63, which will be described later, measures a conveying speed of the solder 9 and a control member, which will be described later, instructs the drawing-out motor 11a to set the drawing-out speed of the solder 9a so that the drawing-out speed of the solder 9a is somewhat slower than a fixed conveying speed in order to give the solder 9, 9a the fixed conveying speed or impart a predetermined back tension to the solder 9, 9a.

Since an amount of flux 3 applied (coated) to a surface of the solder 9 varies if the conveying speed of the solder 9, 9a varies, any irregular conveying speed of the solder 9, 9a causes it to be difficult to apply (coat) the flux 3 to the surface of the solder 9 with uniform thickness. For example, when the conveying speed of the solder 9a becomes faster, the flux 3 applied to the surface of the solder 9a becomes thicker. On the other hand, when the conveying speed of the solder 9a becomes slower, the flux 3 applied to the surface of the solder 9a becomes thinner. In other words, in order to apply (coat) the flux 3 to the surface of the solder 9a uniformly, it is desirable that the solder 9, 9a is conveyed at a regular speed.

The control portion 5 may control the laser sensor 63 to measure the conveying speed of the solder 9 and control the torque of the drawing-out roller 11 so as to allow the solder 9a to become the regular speed.

The chamber 2 forms housing. An entrance 38 for enter the solder 9a is provided at a lower portion of an upstream side (left side) wall of the chamber 2. An exit 39 is provided at an upper portion of a downstream side (right side) wall of the chamber 2. Conveying rollers 41 for conveying the solder 9 to the conveying portion 4 are also provided across the exit 39 of the chamber 2. The chamber 2 contains the flux tank 30, a heating and drying furnace 20, a thermal insulation air curtain 24, a discharging port 25, a cooler 26, a solder thermal sensor 27, an indoor thermal sensor 28 and a pulling-up roller 37 on a passing order of the solder (from a lower portion to an upper portion in the drawing). At outside of the chamber 2, a user interface such as a manipulation portion 14, a display portion 15 and the like is provided.

Liquid flux 3 including an active agent component such as organic acid and solvent (isopropyl alcohol or the like) is inserted into the flux tank 30. The flux tank 30, as the dipping member, dips the solder 9a into the flux 3 to apply (coat) the flux 3 to the surface of the solder 9a. The flux tank 30 has a hexagonal section in which symmetrical oblique sides extend from two lower points of a rectangle. This sectional configuration is introduced because an amount of the flux 3 accumulated in the flux tank 30 can be limited. The sectional configuration is not limited thereto: it may be a rectangle or a square.

A chiller/heater, not shown, is connected to the flux tank 30. The control portion 5 controls the chiller/heater to maintain temperature of the flux 3 at a normal temperature, for example, around 25 degrees C. Since viscosity of the flux varies when the temperature of the flux 3 varies, an amount of flux 3 applied (coated) to the surface of the solder 9 also varies, so that the flux 3 applied (coated) to the surface of the solder 9 has uneven thickness. This can be prevented by maintaining temperature of the flux 3 at a fixed temperature around 25 degrees C. By maintaining temperature of the flux 3 at a fixed temperature, the flux 3 can be stably accumulated in the flux tank 30.

When any volatile component in the flux 3 is evaporated, specific gravity of the flux 3 varies. This variation of the specific gravity causes the amount of flux 3 applied (coated) to the surface of the solder 9 to vary. This becomes a cause of applying (coating) the flux 3 to the surface of the solder 9 with uneven thickness. Thus, administration of specific gravity of the flux 3 contained in the flux tank 30 is also important.

In this embodiment, an upper lid 32 is provided on the flux tank 30. Openings 33, 34 are formed in the upper lid 32. The opening 33 forms an inlet of the solder 9a into the flux tank 30 and the opening 34 forms an outlet of the solder 9 from the flux tank 30. A driven conveying roller 31 is provided on a left position of the upper lid 32. The conveying roller 31 changes a running direction of the solder 9 so that the solder 9a cannot contact the upper lid 32 nor the flux tank 30 when inserting the solder 9a into the flux tank 30.

A conveying roller 36 is provided inside the flux tank 30 so that the conveying roller 36 is driven when conveying the solder 9. Bearing members 36a are provided so as to be suspended from the upper lid 32 of the flux tank 30 and bear a shaft of the conveying roller 36. The conveying roller 36 turns the conveying direction of the solder 9 dipped into the flux tank 30 from a bottom of the flux tank 30 to a top thereof. The solder 9 turned upward by the conveying roller 36 releases the conveying roller 36 at a point of contact 36b.

The pulling-up roller 37 is provided inside the chamber 2 and bearing members 37a are suspended from a roof portion of the chamber 2.The pulling-up roller 37 is driven when conveying the solder 9. The pulling-up roller 37 is provided over the conveying roller 36 to pull up the solder 9 dipped into the flux tank 30. The solder 9 released from the conveying roller 36 at the point of contact 36b is pulled up through the point of contact 37b of the pulling-up roller 37. The point of contact 37b is positioned right over the point of contact 36b.

The pulling-up roller 37, together with the conveying roller 36, pull up the solder 9 which is dipped into the flux tank as the dipping member and to which the flux 3 is applied (coated) vertically in relation to a liquid surface of the flux 3.

The heating and drying furnace 20 heats and dries the solder 9 to which the flux 3 is applied (coated). The heating and drying furnace 20 is provided on the flux tank 30 and forms vertically oriented housing. The heating and drying furnace 20 forms passage holes 20a, 20b for the solder 9 at centers of both bottom and roof portions thereof. The solder 9 to which the flux 3 is applied (coated) enters the heating and drying furnace 20 through the passage hole 20b and is heated and dried within the heating and drying furnace 20. The heated and dried solder 9 is discharged from the passage hole 20a.

The heating and drying furnace 20 maintains its heating temperature within a range from 90 degrees C. to 110 degrees C. to volatilize any solvent contained in the flux 3. Heat insulation material, not shown, is provided in the wall of the housing of the heating and drying furnace 20. This heat insulation material prevents heat from being escaped and enables the solder 9 to be efficiently heated and dried.

A heater 21 provided outside the chamber 2 is contacted with the heating and drying furnace 20 through a duct 22. The heater 21 sends hot air to the heating and drying furnace 20 through the duct 22. A wind prevention wall is attached at a nozzle portion of the duct 22 to prevent the thickness of the flux 3 applied (coated) to the surface of the solder 9 from being changed by directly striking the hot air to the solder 9.

The thermal insulation air curtain 24 blocks the hot air discharged from the heating and drying furnace 20 and the solvent volatilized therefrom and it prevents them from being flown upward. In this embodiment, the thermal insulation air curtains 24 are provided at right and left positions around the passage of the solder 9 over the heating and drying furnace 20. The thermal insulation air curtain 24 sends air toward heated gas out of the passage hole 20a of the heating and drying furnace 20 (see arrows defined by outlines shown in FIG. 1). The air pressure in this moment is around 380 L/min and 0.56 MPa as an example.

The cooler 26 cools the heated and dried solder 9. In this embodiment, coolers 26 are provided around the passage of the solder 9 one by one over the thermal insulation air curtain 24. For the cooler 26, a cooler of heat pump type, a vortex cooler or the like is used. The cooler 26 sends air to the conveyed solder 9 (see black arrows shown in FIG. 1) and cools the heated solder 9 (for example, below 40 degrees C.). The air pressure of the cooler 26 in this moment is around 250 L/min and 0.2 MPa as an example. By such a step of heating and drying the solder 9 to which the flux 3 is applied (coated) and cooling the solder 9, it is impossible to adhere or fix the flux 3 applied (coated) to the solder 9 to another member. Accordingly, it is possible to stably apply the flux 3 to the solder 9a.

The discharging port 25 discharges the hot air outside the heating and drying furnace 20 as the drying device from the chamber 2. In this embodiment, the discharging port 25 includes three discharging holes formed on the side wall of the chamber 2 at three upper and lower positions and is communicated to the chamber 2 and an outside of the chamber 2. The discharging port 25 is provided for discharging the hot air outside the heating and drying furnace 20 from the chamber 2 and the volatilized solvent or the like to the outside of the chamber 2. Around the discharging port 25, a fan and a motor for rotating the fan, which are not shown, are provided. By driving the motor to rotate the fan, the hot air, the volatilized solvent and the like are sucked from the chamber 2. A fire protection damper may be provided around the discharging port 25. Although the discharging port 25 includes three discharging holes in this embodiment, the invention is not limited to three discharging holes: A plurality of discharging holes can be provided to accelerate circulation of gas within the heating and drying furnace 20 and to maintain the temperature thereof uniformly.

The solder thermal sensor 27 is a noncontact type sensor and is provided over the cooler 26 in the chamber 2. The solder thermal sensor 27 measures temperature of the surface of the cooled solder 9. For example, when the temperature of the surface of the cooled solder 9 is 40 degrees C. or more, the solder thermal sensor 27 sends an alarm signal S27 to the control portion 5.

The indoor thermal sensor 28 is provided at an upper portion of the chamber 2. The indoor thermal sensor 28 measures temperature in the chamber 2. For example, when the temperature in the chamber 2 is 60 degrees C. or more, the indoor thermal sensor 28 sends an alarm signal S28 to the control portion 5.

The manipulation portion 14 includes an input portion such as numeric keys, a touch panel and the like, which are not shown. The manipulation portion 14 allows a user to input and set a control condition of the thickness of the flux 3 in the flux applying device 100. The control condition of the thickness of the flux 3 includes composition, size, temperature and the like of the solder 9a and flux 3.

The conveying rollers 41 are driven rollers which are driven when the solder 9 is conveyed. The conveying rollers 41 are provided across the exit 39 of the chamber 2 so as to support their shafts by bearing members, not shown. In this embodiment, as the conveying rollers 41, a pair of upper and lower rollers is provided but this invention is not limited thereto. As the pair of upper and lower rollers, rollers 45 and 46, which will be described later, may be used.

The conveying portion 4 conveys the solder 9 on which the flux 3 is applied (coated). The conveying portion 4 includes conveying rollers 42, 43, each of which contains upper and lower rollers, and conveying roller 44 containing a roller. In this embodiment, the conveying rollers 42, 43 and 44 are driven rollers but they may be driven by a motor. When they are driven by the motor, they may be used for the rollers for convey the solder 6 at a regular speed. In addition, the number of the conveying rollers provided in the conveying portion 4 and/or the number of roller in each conveying roller are not limited thereto.

The conveying rollers 42, 43 are driven rollers in which the upper and lower rollers nip both ends of the solder 9 and rotate conforming to the conveying speed of the solder 9.

The following will describe a configuration example and an operation example of the conveying rollers 42 containing two upper and lower rollers. The conveying rollers 41 and 43 have the similar configuration to the conveying rollers 42 in this embodiment. The conveying rollers 42 shown in FIG. 2A convey the solder 9 with the upper and lower rollers 45, 46 nipping both ends of the solder 9.

The roller 45 has fringe portions 45a, 45b and a rotating shaft 42a. The roller 46 has large fringe portions 46a, 46b at right and left ends thereof and small fringe portions 46c, 46d, which are smaller than the large fringe portions 46a, 46b, inside the large fringe portions 46a, 46b. The roller 46 also has a rotating shaft 42b.

Diameters of the lower rollers 45, 46 and the rotating shafts 42a, 42b are optional. It is desirable that whole widths w1 of the lower rollers 45, 46 are the same. It is desirable that a width which extends from an end of the fringe 45a to an end of the fringe 45b is the same as a width which extends from an end of the small fringe 46c to an end of the small fringe 46d. It is desirable that a width of each of the fringes 45a, 45b is the same as a width of each of the small fringes 46c, 46d. Accordingly, the fringe 45a and the small fringe 46c are contacted to each other and the fringe 45b and the small fringe 46d are contacted to each other. Thus, the conveying rollers 42 conveys the solder 9 with the fringe 45a and the small fringe 46c nipping an end of the solder 9 along a width direction of the solder 9 as well as the fringe 45b and the small fringe 46d nipping the other end of the solder 9 along a width direction of the solder 9.

Figure 2A:
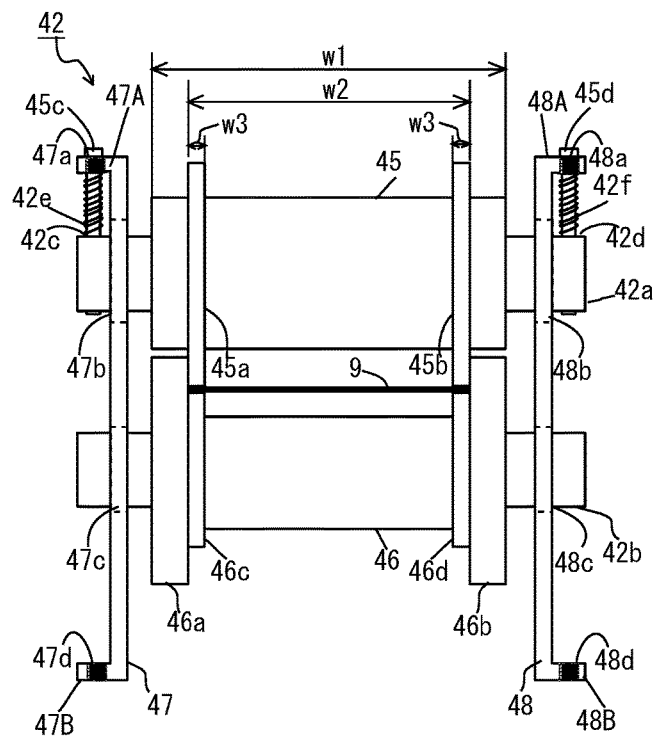
FIG. 2A is a plan view of conveying rollers 42 showing a configuration example thereof.

The roller shaft bearing member 47 of the conveying rollers 42 has a configuration in which supporting projection portions 47A, 47B are projected from at upper and lower ends of a rectangular plate. The supporting projection portion 47A has a hole 47a. The roller shaft bearing member 47 has two openings 47b, 47c at two upper and lower portions of the rectangular plate. The rotating shafts 42a, 42b of the rollers 45, 46 are respectively passed through the openings 47b, 47c. The opening 47b shown in FIG. 2C is formed as a vertically oriented oval. A width w4 of the opening 47b is slightly larger than the diameter of the rotating shaft 42a. A vertical length of the opening 47b may be configured to be an optional length so that the roller 45 can be moved away from the roller 46. A threaded hole 47d for attaching the roller shaft bearing member 47 to a table or the like is formed in the supporting projection portion 47B. A diameter of the opening 47c is slightly larger than a diameter of the rotating shaft 42b of the roller 46.

The roller shaft bearing member 48 of the conveying rollers 42 has the same configuration as the roller shaft bearing member 47 but they are arranged so as to be inverted to right and left. The roller shaft bearing member 48 has a configuration in which supporting projection portions 48A, 48B are projected from at upper and lower ends of a rectangular plate. The supporting projection portion 48A has a hole 48a. The roller shaft bearing member 48 has two openings 47b, 47c at two upper and lower portions of the rectangular plate. The rotating shafts 42a, 42b of the rollers 45, 46 are respectively passed through the openings 48b, 48c. A threaded hole 48d for attaching the roller shaft bearing member 48 to the table or the like is formed in the supporting projection portion 48B.

Both ends of the rotating shaft 42a of the roller 45 have threaded holes 42c, 42d at a radial direction. A screw 45c is screwed into the threaded hole 42c of the rotating shaft 42a through the hole 47a of the roller shaft bearing member 47. In this moment, the screw 45c is inserted into a spring 42e between the supporting projection portion 47A and the rotating shaft 42a. A screw 45d is screwed into the threaded hole 42d of the rotating shaft 42a through the hole 48a of the roller shaft bearing member 48. In this moment, the screw 45d is inserted into a spring 42f between the supporting projection portion 48A and the rotating shaft 42a. Thus, the roller 45 is suspended from the supporting projection portions 47A, 48A by the screws 45c, 45d and the springs 42e, 42f.

Figure 2B:
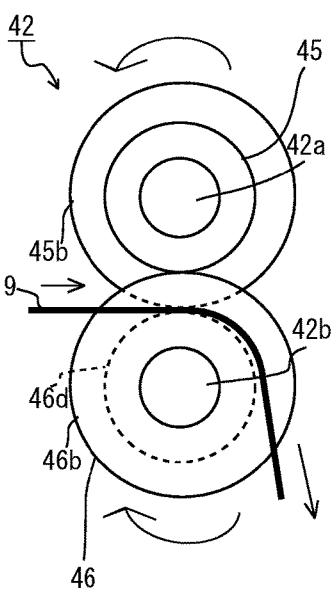
FIG. 2B is a right side view of the conveying rollers 42 showing an operation example thereof.
Figure 2C:
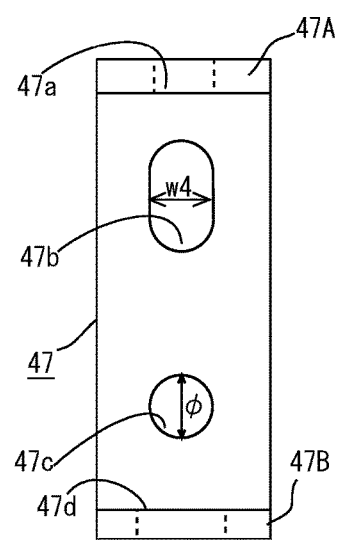
FIG. 2C is a side view of a roller shaft bearing member 47 showing a configuration example thereof.

As shown in FIG. 2B, when the solder 9 is conveyed between the rollers 45, 46, the fringe 45b of the roller 45 and the small fringe 46d of the roller 46 nip an end of the solder 9 along the width direction thereof. When the solder 9 is conveyed from left to right (a direction of a black arrow shown in FIG. 2B) and it is conveyed around a circumference of the roller 46 and conveyed downward, the roller 45 rotates counterclockwise and the roller 46 rotates clockwise, as shown by arrows shown in FIG. 2B.

As shown in FIG. 2A, when the solder 9 is conveyed between the rollers 45, 46, the roller 45 is lifted by only the thickness of the solder 9. The springs 42e, 42f apply downward elastic force to the roller 45 by lifting the roller 45. Accordingly, it is possible to convey the solder 9 with the conveyed solder 9 being elastically nipped. Further, an area of the solder 9 which a roller contacts while the solder 9 is conveyed is decreased as compared with a case where the solder 9 is conveyed using a cylindrical roller, thereby preventing the solder 9 from being extended or deformed. Thus, it is possible to convey the solder 9 with maintaining its quality.

Figure 3A:
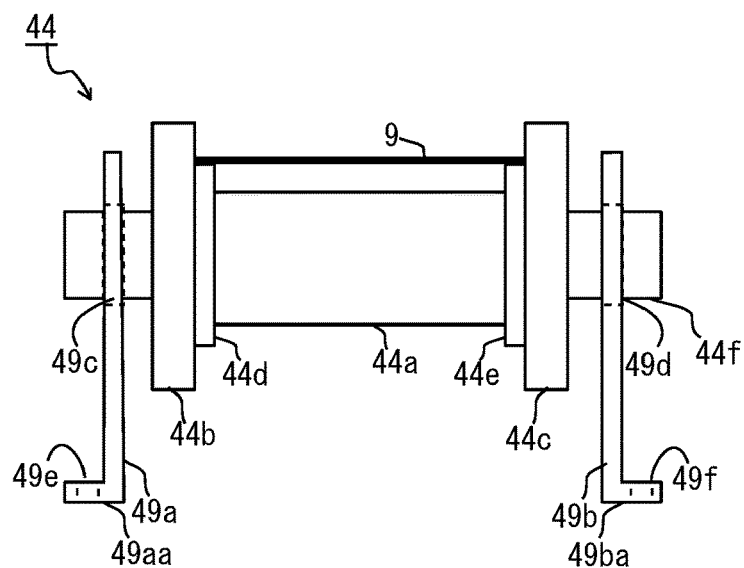
FIG. 3A is a plan view of another conveying roller 44 showing a configuration example thereof.

The conveying roller 44 shown in FIG. 1 is a driven roller following the conveyance of the solder 9. As shown in FIG. 3A, the conveying roller 44 has the same configuration as that of the roller 46. The conveying roller 44 has a cylindrical roller main body 44a, large fringes 44b, 44c, small fringes 44d, 44e inside each large fringe, and a rotating shaft 44f. The rotating shaft 44f of the conveying roller 44 is inserted to holes 49c, 49d of roller shaft bearing members 49a, 49b. Each of the roller shaft bearing members 49a, 49b has a configuration in which supporting projection portion 49aa, 49ba is projected from at a bottom end of a rectangular plate. A threaded hole 49e, 49f is formed in the supporting projection portion 49aa, 49ba to attach the roller shaft bearing member 49a, 49b to a table or the like.

The conveying roller 44 conveys the solder 9 with both ends of the solder 9 along the width direction thereof being put on the small fringes 44d, 44e. This allows an area of the solder 9 which a roller contacts while the solder 9 is conveyed to be decreased. Thus, it is possible to convey the solder 9 with maintaining its quality.

Figure 3B:
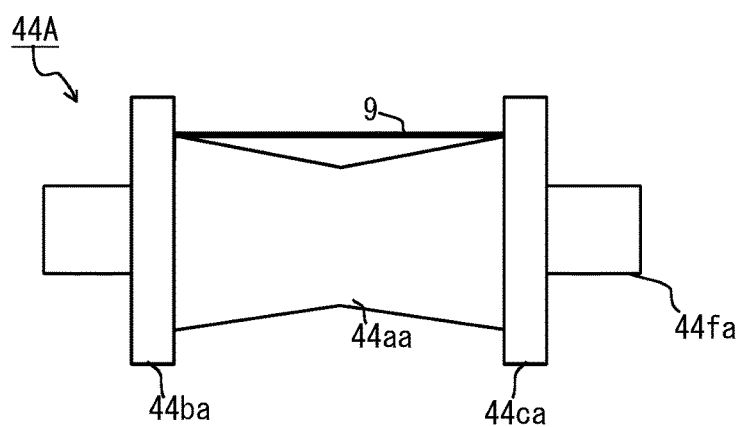
FIG. 3B is a plan view of a conveying roller 44A as a variation of said another conveying roller 44 showing a configuration example thereof.

A conveying roller 44A shown in FIG. 3B as a variation of the conveying roller 44 has a roller main body 44aa, fringes 44ba, 44ca, and a rotating shaft 44fa. A bearing member, not shown bears and supports the conveying roller 44A. The roller main body 44aa has a shape like a sandglass, namely, a diameter thereof becomes gradually smaller from its opposite ends to its middle portion and the diameter of the middle portion is the smallest.

The conveying roller 44A conveys the solder 9 with both ends of the solder 9 along the width direction thereof being put on the conveying roller 44A. This allows an area of the solder 9 which the roller main body 44aa contacts to be decreased. Thus, it is possible to convey the solder 9 with maintaining its quality. Further, the conveying roller 44A devises the shape of the roller main body 44aa to decrease the area of the solder 9 which the roller main body 44aa contacts, which is different from the conveying roller 44. Such a device of the shape of the roller main body 44aa enables the solder 9 having any width that is narrower than a whole length of the roller main body 44aa to be conveyed, without bearing any relation to the width of the small fringe 44d, 44e. Such a configuration of the conveying roller 44, 44A may be applied to any of the conveying rollers 31, 36, a speed detection roller 64, and the pulling-up roller 37.

As shown in FIG. 1, the laser sensor 63 that measures a conveying speed of the solder 9 and the speed detection roller 64 are disposed at the upstream side of a winding roller 66 so that the conveying solder 9 is put between them.

The laser sensor 63 is a conveying speed measurement device that measures a conveying speed v of the solder 9. The laser sensor 63 is a noncontact type sensor and sends a pulse signal based on a measurement result thereof to the control portion 5. The speed detection roller 64 is provided corresponding to the laser sensor 63 and rotates following the conveyance of the solder 9. The speed detection roller 64 has a reflection body 64a for reflecting laser light from the laser sensor 63 on a circumferential point thereof.

The reflection body 64a reflects the laser light emitted from the laser sensor 63 together with the rotation of the speed detection roller 64. The laser sensor 63 receives the reflected laser light and sends the pulse signal based on the measurement result thereof to the control portion 5. The control portion 5 calculates number of revolution per minute of the speed detection roller 64 from a frequency of the received pulse signal. The control portion 5 also calculates the conveying speed v of the solder 9 from the calculated number of revolution per minute of the speed detection roller 64. The control portion 5 controls a rotation speed of the winding roller 66 based on this information so that the solder 9 is conveyed at a uniform conveying speed. By pull the solder 9 up vertically at the uniform conveying speed from the flux tank 30, the flux 3 remains on a surface of the solder 9 and a back surface thereof with uniform thickness according to the conveying speed v of the solder 9 because interfacial tension acts on the solder 9a and the flux 3.

The winding portion 6 shown in FIG. 1 includes the winding roller 66 of the solder 9, a winding motor 66a that is attached to the winding roller 66 and rotates the winding roller 66, and an interlayer paper sheet supplying roller 65.

The winding roller 66 rotates so that the solder 9 is conveyed at the conveying speed v, and winds the solder 9. The winding roller 66 winds the solder 9, pulled up from the flux tank 30, to which the drawing-out roller 11 applies the predetermined load at the upstream side of the flux tank 30. This realizes the stable conveying speed v of the solder 9.

More preferably, the control portion 5 connected with the winding motor 66a to drive and rotate it and controls a rotation speed of the winding motor 66a so that the winding roller 66 rotates by linkage with the rotation of the winding motor 66a so that the solder 9 is wound at a predetermined speed.

The interlayer paper sheet supplying roller 65 rotates following the conveyance of the solder 9. The interlayer paper sheet supplying roller 65 supplies an interlayer paper sheet 67 to an interlayer position between the solders 9 when the winding roller 66 winds the solder 9 so that the wound solders 9 are not contacted to each other. For the interlayer paper sheet 67, a long paper sheet having the same width as that of the solder 9 is used.

In this embodiment, the drawing-out roller 11 is arranged at the upstream side of the flux tank 30 and applies any predetermined load to the solder 9a along the conveying direction of the solder 9a together with the winding roller 66 as the winding portion. The drawing-out roller 11 and the winding roller 66 cooperate to apply any load to the solder 9, 9a, and thereby applying tension to the solder 9, 9a. They also vertically pull up the solder 9 to which the flux 3 is applied at a fixed conveying speed v. The flux 3 is applied (coated) to the solder 9, which is vertically pulled up at a fixed conveying speed v, with a uniform thickness.

Further, although the drawing-out roller 11 has been illustrated as a load applying member in this embodiment, any load applying member other than the drawing-out roller 11 may be provided. In this case, it is preferable that the load applying member is arranged outside the chamber 2 in order to avoid any influence of variation in temperature or humidity within the chamber 2. The load applying member, however, may be arranged inside the chamber 2 as long as the load applying member is provided at the upstream side of the flux tank 30.

[Control of Conveying Speed of Solder 9]

Figure 4:
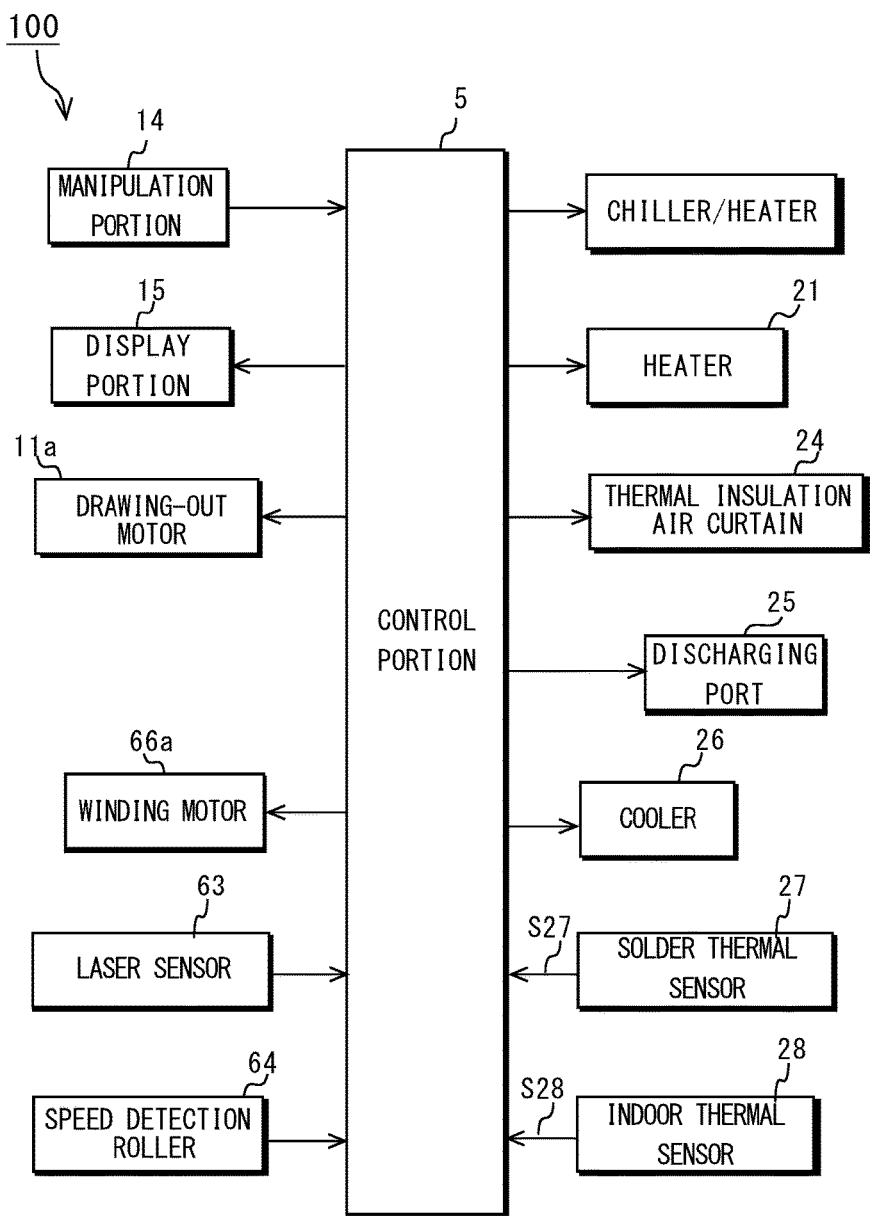
FIG. 4 is a block diagram showing a configuration example of a control system of the flux applying device 100.

Next, the following will describe a configuration of a control system of the flux applying device 100 and control steps thereof with reference to FIG. 4. The control portion 5 is connected with the manipulation portion 14, the display portion 15, the winding motor 66a, the laser sensor 63, the speed detection roller 64 and the like, in order to control the conveying member and the conveying speed of the solder 9.

The control portion 5 contains, for example, a read only memory (ROM), a random access memory (RAM), a central processing unit (CPU) and storage member, in order to control whole of the system. For example, ROM stores a system program for controlling whole of the flux applying device 100.

The control portion 5 controls the vertical lift of the solder 9 and the conveying speed v of the solder 9 corresponding to composition of the flux 3. This enables an oversupply of the flux 3 to be constantly removed from the solder 9 so that thickness of the flux 3 on the solder 9 is controlled.

A user inputs a thickness control condition and the like through the manipulation portion 14. The control portion 5 produces conveying speed control data about the conveying speed v of the solder 9 based on the input thickness control condition.

The control portion 5 controls input/output of the winding motor 66a, the laser sensor 63, the speed detection roller 64 and the like, based on the conveying speed control data.

The following will describe control steps of the conveying speed v of the solder 9 based on the conveying speed control data.

The control portion 5 controls the winding motor 66a to rotate so that the solder 9a is drawn out of the drawing-out roller 11 at a predetermined speed. A program is previously created so that the solder 9 can be wound on the winding roller 66 at a fixed circumferential speed in spite of a diameter of turned solder 9 (an amount of wound solder) on the winding roller 66. The laser sensor 63 measures the conveying speed of the solder 9, 9a, which will be described later, and the control portion 5 instructs the winding speed of the solder 9 to the winding motor 66a so that the solder 9 is conveyed at a fixed conveying speed, which will be described later.

The drawing-out roller 11 draws out the solder 9a at a predetermined speed, linked together the rotation of the drawing-out motor 11a. The control portion 5 calculates a length of the outermost peripheral solder 9a from the thickness of the solder 9a. The length of the outermost peripheral solder 9a is decreased for every time the drawing-out roller 11 rotates. Based on such a calculation, a drawing-out speed of the solder 9a by the drawing-out roller 11 is made constant.

The control portion 5 controls the winding motor 66a to rotate so that the winding roller 66 can rotate. The winding roller 66 and the drawing-out roller 11 cooperate to apply a predetermined load, tension, to the solder 9. By applying any predetermined tension to the solder 9, the solder 9 dipped to the flux tank 30 is pulled up from the flux tank 30 with keeping the conveying speedy (v=700 mm/min). The conveying speed v of the solder 9 is kept constant from the drawing-out roller 11 to the winding roller 66 through the flux tank 30.

The control portion 5 controls the laser sensor 63 to detect the conveying speed of the solder 9. When the conveying speed of the solder 9 becomes slower, the rotation speed of the winding motor 66a is increased. On the other hand, when the conveying speed of the solder 9 becomes faster, the rotation speed of the winding motor 66a is decreased.

The control portion 5 calculates the number of revolution per minute of the speed detection roller 64 based on the pulse signal from the laser sensor 63 and the speed detection roller 64. Based on the number of revolution, the control portion 5 calculates an actual conveying speed of the solder 9. The control portion 5 adjusts the winding motor 66a so that the actual conveying speed of the solder 9 is brought to the conveying speed v (v=700 mm/min). This enables the conveying speed of the solder 9 to be kept constant. For example, a thin uniform film of the flux 3 having a one-side of 10 μm can be coated on the solder 9a.

The control portion 5 also performs a temperature control. The control portion 5 controls a temperature control device, not shown, equipped with the flux tank 30 to drive so that temperature of the flux 3 contained in the flux tank 30 is kept at a fixed temperature (for example, 25 degrees C.).

The control portion 5 controls the heater 21 connected to the heating and drying furnace 20 to drive (heat and dry) the heater 21 so that the temperature in the heating and drying furnace 20 stays within a range of 90 through 110 degrees C.

The control portion 5 controls the thermal insulation air curtain 24 to blow air toward heated gas out of the passage hole 20a so that hot air and/or volatilized solvent from the heating and drying furnace 20 cannot be spread into the chamber 2.

The control portion 5 controls a fan, not shown, equipped with the discharging port 25 to discharge the hot air, which is flown out of the heating and drying furnace 20 to the chamber 2, from the chamber 2 to outside. The control portion 5 controls a motor connected with the fan, not shown, equipped with the discharging port 25 to drive the fan. When the motor rotates and the fan rotates, the hot air within the chamber 2 is blown into the discharging port 25.

The control portion 5 controls the cooler 26 to blow cooled air to the heated and dried solder 9 and cool it. In this moment, it is preferable that the cooler 26 cools the solder 9 below 40 degrees C.

The control portion 5 is connected to the solder thermal sensor 27. The solder thermal sensor 27 always measures temperature of the solder 29. When the temperature of the solder 29 exceeds the fixed temperature (for example, 40 degrees C.), the solder thermal sensor 27 sends the alarm signal S27 to the control portion 5. When the control portion 5 receives the alarm signal S27, the control portion 5 stops rotation of the winding motor 66a and the like until the temperature of the solder 29 becomes the fixed temperature or less.

The control portion 5 is connected to the indoor thermal sensor 28. The indoor thermal sensor 28 always measures temperature of the chamber 2. When the temperature in the chamber 2 exceeds the fixed temperature (for example, 60 degrees C.), the indoor thermal sensor 28 sends the alarm signal S28 to the control portion 5. When the control portion 5 receives the alarm signal S28, the control portion 5 stops the heater 21 and the conveyance of the solder 9 until the temperature in the chamber 2 becomes the fixed temperature or less. The control portion 5 also stops opening a door, not shown, of the chamber 2 until the temperature in the chamber 2 becomes the fixed temperature or less.

The order of the control steps is not limited to the above-mentioned one. The control portion 5 can perform plural control steps at the same time. Any storage device may be provided in or out the control portion 5 to store thickness control condition, control data and/or the like.

By using a thickness gauge 40 of noncontact type, which is shown in FIG. 1, to detect an amount of applied flux 3 on the solder 9 at real time, a thickness control can be performed by a feedback control based on the detection of the amount of applied flux 3. According to such a feedback control, when the thickness of the flux 3 to the solder 9 is thicker, the conveying speed v of the solder 9 is set to be slower so that the flux 3 to be applied (coated) to the solder 9 is decreased. On the contrary, when the thickness of the flux 3 to the solder 9 is thinner, the conveying speed v of the solder 9 is set to be faster so that the flux 3 to be applied (coated) to the solder 9 is increased.

[Configuration Example of Solder 9]

Figure 5A:
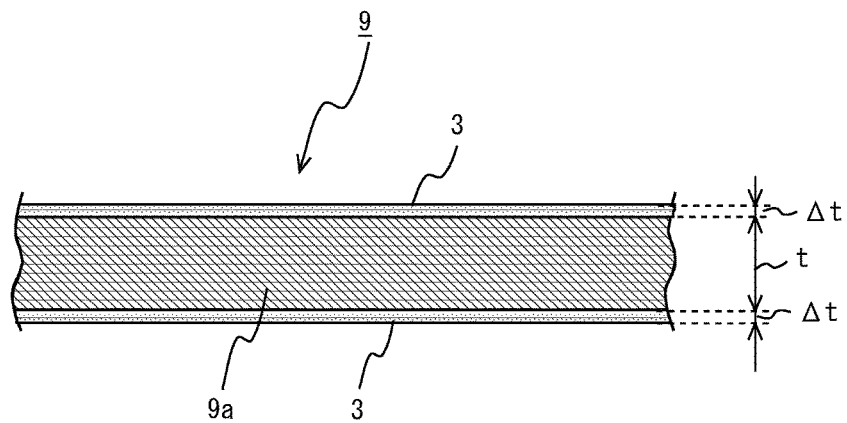
FIG. 5A is a sectional view of solder 9 showing a configuration example thereof.
Figure 5B:
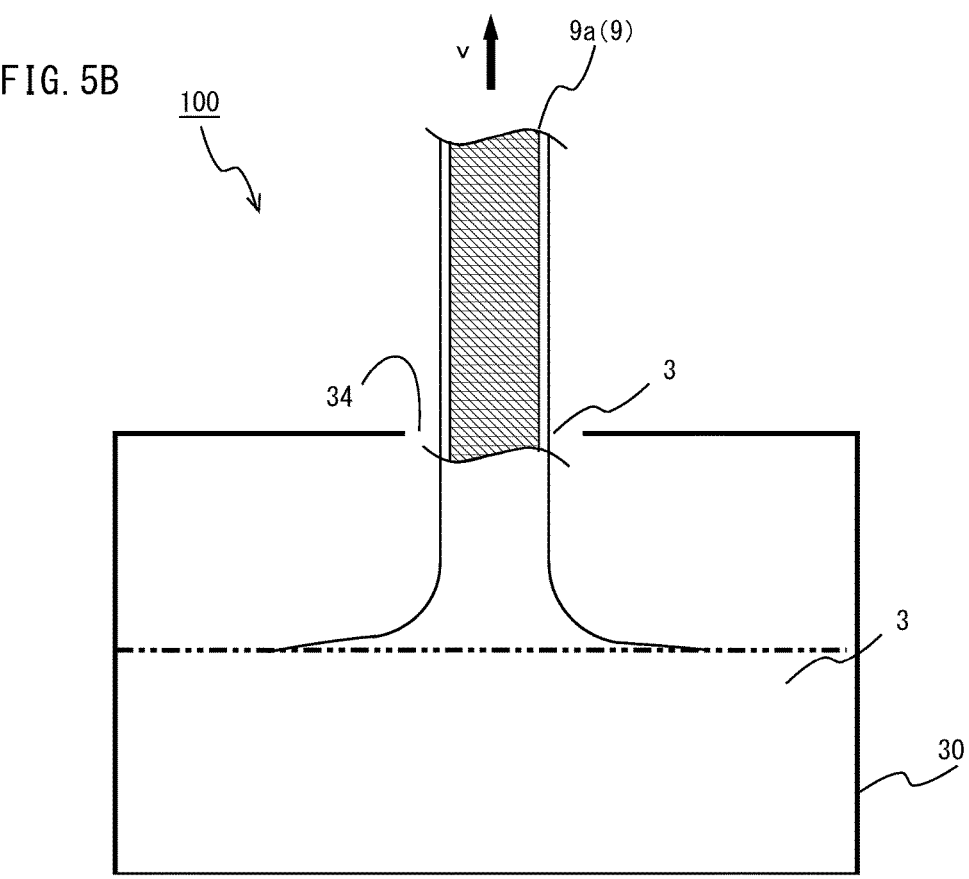
FIG. 5B is a process diagram showing a forming example of the solder 9.

The following will describe a configuration example of the solder 9 to which the flux is applied with reference to FIGS. 5A and 5B. The solder 9 shown in FIG. 5A is formed by the solder 9a to which no flux is applied and the flux 3 coating on the surface and back surface of the solder 9a. The solder 9a has a predetermined width, not shown, (about 15 mm through 40 mm) and a predetermined thickness t (t=about 0.25 mm). The flux 3 has thickness Δt.

The solder 9 shown in FIG. 5B indicates a case where the solder 9 is forming in the flux applying device 100 and the thickness of the flux 3 is controlled. The flux 3 having predetermined temperature (for example, 25 degrees C.) is inserted into the flux tank 30. The solder 9a is conveyed at a predetermined speed and dipped into the flux tank 30. The solder 9a dipped into the flux tank 30 is pulled up from the flux tank 30 at the conveying speed v vertically (to a direction of a black arrow shown in FIG. 5B) in relation to a liquid surface of the flux 3, which is shown by two-dot chain line in FIG. 5B). By pulling up the solder 9a from the flux tank 30 at the constant conveying speed v vertically, the interfacial tension acts on the solder 9a and the flux 3, so that the flux 3 having a uniform thickness according to the conveying speed v remains on the surface and back surface of the solder 9a. The solder 9 vertically pulled up is passed through the heating and drying step and the cooling step. The temperature of the solder 9 and the thickness of the flux 3 are then measured. The solder 9 is conveyed and wound. The flux applying device 100 according to the embodiment can control the conveying speed v of the solder 9, 9a so that it is possible to manufacture the solder 9 to which the flux 3 having uniform thickness is applied (coated).

Thus, the flux applying device 100 according to the embodiment applies the flux 3 having uniform thickness to the surfaces of the solder 9a when pulling up it from the flux tank 30. The flux applying device 100 includes the flux tank 30, the drawing-out roller 11, the pulling-up roller 37, the heating and drying furnace 20, the thermal insulation air curtain 24, the cooler 26, the conveying rollers 31, 36, 41 and 42-44, the laser sensor 63, the speed detection roller 64, and the winding roller 66.

Based on such a configuration, since it is possible to convey the solder 9, 9a at a fixed conveying speed v, the thickness of the flux 3 applying to the solder 9a can be controlled so as to be made constant and 10 μm or less. Accordingly, it is possible to realize the application of the flux with very thin thickness as compared by a past example. Since any special member for removing the surplus of the flux 3 is not required in this invention, production costs therefor can be saved and its maintenance is also made easy.

Further, the solder 9 according to the embodiment is vertically pulled up from the flux tank 30 containing the flux 3 and is conveyed at a fixed conveying speed v. Accordingly, the thickness of the flux 3 applied (coated) to the solder 9 is made constant. It is possible to apply the flux 3 with thin thickness to the solder 9, which is excellent in stability and evenness of the coat surface.

It should be understood by those skilled in the art that various modifications, combinations, sub-combinations and alterations may occur depending on design requirements and other factors insofar as they are within the scope of the appended claims or the equivalents thereof.

Although a case where one strip of the solder 9 is made has been described in the above embodiments, the invention is not limited thereto. For example, two or more strips of the solder 9 may be made at the same time. Since many solders 9 at once can be made in this case, running costs can be saved.

Further, the pulling-up roller 37 and the conveying rollers 31, 36 and 41-44 is not limited to the driven roller. In order to convey the solder 9 at a predetermined conveying speed under the control of the control portion 5 and the condition where the drawing-out roller 11 applies any load to the solder 9, a motor, not shown, connected to the control portion 5 can be provided to each of them and the motor can be controlled so as to rotate them at a fixed speed according to the desired conveying speed v. To the flux tank 30, a flux controller for controlling a liquid volume of stored flux 3 and/or a reserve tank for reserving the flux 3 can be connected in order to make the component and amount of the flux stored in the flux tank 30 constant.

Although the flux applying device 100, as the liquid coating device, in which the flux 3 is applied to the solder 9a has been described in the above embodiments, the invention is not limited thereto. For example, this invention may be applied to the liquid coating device in which liquid such as coating liquid in place of the flux 3 is coated on a surface of long matrix such as metal or resin in place of the solder 9a. In this case, such a liquid coating device can be configured so as to be the same as that of the flux applying device 100. Further, the long matrix such as metal or resin is conveyed at a fixed conveying speed v while the load is applied to the matrix and the matrix is pulled up vertically in relation to the surface of the liquid such as coating liquid, so that it is possible to manufacture a coated member in which uniform coating is performed on a surface of the matrix such as metal or resin.

The invention may be very preferably applied to a flux applying device that applies flux to the solder with uniform thickness and/or a liquid coating device that coats liquid such as coating to the surface of the matrix.

What is claimed is:
1. A liquid coating device comprising:
   a flux tank into which an object to be coated is dipped into liquid to coat the liquid on a surface of the object, the object having a length;
   a conveyor system that conveys the object at a predetermined speed along an object conveying path, the object coated in the flux tank being vertically lifted upward from a surface of the liquid;
   a load applying member that applies a predetermined load to the object conveyed by the conveying system, the load applying member being disposed at an upstream side of the flux tank along the object conveying path when a side of the object conveying path in which the object enters the flux tank is set to be the upstream side and a side of the object conveying path in which the object is discharged from the flux tank is set to be a downstream side;
   a dryer that dries the object on which the liquid is applied;
   a cooler that cools the dried object;
   a conveying speed measurement sensor that measures a conveying speed of the object;
   a control system that controls the conveying system based on a measurement result of the conveying speed measurement sensor; and
   a chamber that applies the liquid to the object, wherein the chamber comprises a housing forming an interior space and at least the flux tank, the dryer and the cooler are located within the interior space, wherein the chamber comprises a discharge port that is communicated to an outside of the chamber and discharges hot air from within the interior space of the chamber to the outside of the chamber.
2. The liquid coating device according to claim 1, wherein the conveying system comprises a drawing-out roller that draws out the object to be coated, and
   the drawing-out roller comprises the load applying member.

3. The liquid coating device according to claim 1, wherein the conveying system comprises a winder that winds the object, and
the winder winds the object so that a conveying speed of the object becomes constant.

4. The liquid coating device according to claim 1, wherein the conveying system comprises at least one conveying roller,
the conveying roller comprises two rollers that nip the object, and
the rollers nip both ends of the object along a width direction of the object.

5. The liquid coating device according to claim 3, wherein the conveying system further comprises an interlayer paper sheet supplying roller that supplies an interlayer paper sheet when the winder winds the object.

6. The liquid coating device according to claim 1, wherein the object to be coated comprises solder and the liquid to be coated includes flux.

7. The liquid coating device according to claim 2, wherein the conveying system comprises a winder that winds the object, and
the winder winds the object so that a conveying speed of the object becomes constant.

8. The liquid coating device according to claim 2, wherein the conveying system comprises at least one conveying roller,
the conveying roller comprises two rollers that nip the object, and
the rollers nip both ends of the object along a width direction of the object.

9. The liquid coating device according to claim 3, wherein the conveying system comprises at least one conveying roller,
the conveying roller comprises two rollers that nip the object, and
the rollers nip both ends of the object along a width direction of the object.

10. The liquid coating device according to claim 2, wherein the object to be coated comprises solder and the liquid to be coated includes flux.

11. The liquid coating device according to claim 3, wherein the object to be coated comprises solder and the liquid to be coated includes flux.

12. The liquid coating device according to claim 4, wherein the object to be coated comprises solder and the liquid to be coated includes flux.

13. The liquid coating device according to claim 5, wherein the object to be coated comprises solder and the liquid to be coated includes flux.

* * * * *